United States Patent
Lee et al.

(10) Patent No.: US 8,484,922 B2
(45) Date of Patent: Jul. 16, 2013

(54) ALKALINE AND HEAT RESISTANT FOAM COMPOSITE AND FLOOR UNDERLAYMENT

(75) Inventors: Shau-Tarng Lee, Oakland, NJ (US); Claes Hermansson, Eksjö (SE); Brent Sholl, Canton, GA (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 165 days.

(21) Appl. No.: 12/707,175

(22) Filed: Feb. 17, 2010

(65) Prior Publication Data
US 2011/0197543 A1    Aug. 18, 2011

(51) Int. Cl.
    *E04B 1/14*      (2006.01)
    *E04B 1/62*      (2006.01)

(52) U.S. Cl.
USPC ........... 52/409; 52/408; 52/745.19; 52/746.1; 52/745.21; 428/316.6; 428/703

(58) Field of Classification Search
USPC ........... 52/408–411, 169.14, 294, 292, 302.1, 52/390, 405.1, 745.19, 746.1, 745.21, 403.1, 52/404.1; 428/316.6, 703, 315.9, 318.8, 138
See application file for complete search history.

(56) References Cited

U.S. PATENT DOCUMENTS

| | | | |
|---|---|---|---|
| 666,780 A * | 1/1901 | Trigalet | 56/200 |
| 1,947,134 A * | 2/1934 | Mills, Jr. | 52/411 |
| 3,000,144 A * | 9/1961 | Kitson | 52/309.11 |
| 3,010,899 A | 11/1961 | Boyer | |
| 3,135,069 A * | 6/1964 | Schuller et al. | 52/516 |
| 3,222,697 A | 12/1965 | Scheermesser | |
| 3,466,222 A * | 9/1969 | Curtis | 428/142 |
| 3,483,664 A * | 12/1969 | Malone, Jr. et al. | 52/309.6 |
| 3,561,334 A * | 2/1971 | Gerosa et al. | 404/75 |
| 3,664,906 A | 5/1972 | Hartig | |
| 3,672,951 A * | 6/1972 | Moore | 428/314.4 |
| 3,717,559 A | 2/1973 | Oyama et al. | |
| 3,763,614 A * | 10/1973 | Hyde et al. | 52/309.9 |
| 3,971,184 A * | 7/1976 | Van Wagoner | 428/201 |
| 4,096,304 A | 6/1978 | Greengrass | |
| 4,170,675 A | 10/1979 | Greengrass | |
| 4,191,798 A | 3/1980 | Schumacher et al. | |
| 4,222,924 A | 9/1980 | Schumacher | |
| 4,263,196 A | 4/1981 | Schumacher et al. | |
| 4,357,377 A * | 11/1982 | Yamamoto | 428/40.3 |
| 4,368,604 A * | 1/1983 | Spielau et al. | 52/309.8 |

(Continued)

FOREIGN PATENT DOCUMENTS

| | | |
|---|---|---|
| DE | 4107594 C1 * | 1/1992 |
| JP | 2000-289133 A | 10/2000 |

*Primary Examiner* — Phi A
(74) *Attorney, Agent, or Firm* — Alston & Bird LLP

(57) ABSTRACT

The invention is directed to a composite foam material that is alkaline and heat resistance. The composite foam material comprises a foam layer that having a film layer attached thereto and in which at least one of the film or foam layers includes a carbon free radical scavenger agent that is dispersed therein. The carbon free radical scavengers neutralize free radicals that are generated in the polymeric material (e.g., film or foam layer) and help prevent the degradation of the foam composite material. In particular, foam composite materials in accordance with the present invention can be used in underlayment applications in which exposure to heat can degrade the underlayment. As a result, the durability and useful life of the composite sheet material can be extended. In some embodiments of the present invention provides a floor underlayment material that overcomes many of the problems discussed above.

32 Claims, 3 Drawing Sheets

U.S. PATENT DOCUMENTS

| | | | |
|---|---|---|---|
| 4,379,190 A | 4/1983 | Schenck | |
| 4,403,007 A | 9/1983 | Coughlin | |
| 4,430,468 A | 2/1984 | Schumacher | |
| 4,434,258 A | 2/1984 | Schumacher et al. | |
| 4,434,261 A | 2/1984 | Brugel et al. | |
| 4,438,228 A | 3/1984 | Schenck | |
| 4,469,741 A | 9/1984 | Akao | |
| 4,472,545 A | 9/1984 | Coughlin et al. | |
| 4,480,061 A | 10/1984 | Coughlin et al. | |
| 4,492,064 A | 1/1985 | Bynoe | |
| 4,614,556 A | 9/1986 | Fry et al. | |
| 4,614,680 A | 9/1986 | Fry et al. | |
| 4,669,246 A * | 6/1987 | Freeman | 52/408 |
| 4,719,723 A * | 1/1988 | Van Wagoner | 52/15 |
| 4,721,643 A | 1/1988 | Harayama et al. | |
| 4,900,616 A * | 2/1990 | Weir et al. | 428/316.6 |
| 4,965,977 A * | 10/1990 | White | 52/410 |
| 5,070,670 A * | 12/1991 | Alderson | 52/410 |
| 5,453,313 A * | 9/1995 | Kiser | 428/143 |
| 5,688,449 A | 11/1997 | Fox | |
| 5,791,109 A * | 8/1998 | Lehnert et al. | 52/309.17 |
| 6,174,930 B1 | 1/2001 | Agarwal et al. | |
| 6,213,540 B1 | 4/2001 | Tusim et al. | |
| 6,306,960 B1 | 10/2001 | Agarwal et al. | |
| 6,512,019 B1 | 1/2003 | Agarwal et al. | |
| 6,569,915 B1 | 5/2003 | Jackson et al. | |
| 6,875,826 B1 | 4/2005 | Huovinen et al. | |
| 6,907,700 B2 * | 6/2005 | Geraud | 52/480 |
| 6,931,809 B1 * | 8/2005 | Brown et al. | 52/409 |
| 7,014,801 B2 | 3/2006 | Imanari et al. | |
| 7,378,044 B1 * | 5/2008 | Hejna et al. | 264/113 |
| 7,651,757 B2 | 1/2010 | Jones et al. | |
| 7,811,663 B2 * | 10/2010 | Paradis et al. | 428/315.9 |
| 2004/0249009 A1 | 12/2004 | Homma et al. | |
| 2005/0090751 A1 | 4/2005 | Balas | |
| 2006/0051543 A1 | 3/2006 | Imanari et al. | |
| 2006/0052466 A1 | 3/2006 | Handa | |
| 2006/0199873 A1 | 9/2006 | Mehta et al. | |
| 2006/0211782 A1 | 9/2006 | Handa et al. | |
| 2006/0260237 A1 * | 11/2006 | Griffin et al. | 52/409 |
| 2008/0307734 A1 * | 12/2008 | Whelan et al. | 52/411 |

* cited by examiner

ALKALINE AND HEAT RESISTANT FOAM COMPOSITE AND FLOOR UNDERLAYMENT

FIELD OF THE INVENTION

The present invention relates to foam laminates and in particular to foam laminates for use as a floor underlayment.

BACKGROUND OF THE INVENTION

Many flooring systems in residential and commercial buildings may comprise a floor supported by wood or steel joists. In some flooring systems the floor may comprise a finished floor that is disposed above a subfloor. In single-family and multi-family homes and small commercial buildings, the subfloor may comprise a poured concrete slab or be formed from wooden boards or panels that are laid over the joists. In some apartment buildings, larger commercial buildings and other steel-frame buildings, the subfloor may be a steel deck, precast concrete slabs or panels, or poured concrete.

The finished flooring provides a decorative, aesthetically pleasing floor surface. The finished flooring may be wood, such as wood planks, parquet flooring, laminate flooring, and wood-block flooring, or a resilient material, such as linoleum, asphalt tile, or vinyl or rubber tile or sheet, or carpeting.

Concrete typically comprises a combination of aggregate and a cement binder having a high water content. In some cases, the concrete may also include calcium chloride as a cure agent for accelerating curing of the concrete. After mixing, the cement hydrates and eventually hardens into a hard stone-like material. In many cases, the concrete retains a high moisture content that may slowly dissipate from within the concrete over a period of time. In some cases, concrete may also wick moisture from the surrounding environment, such as the ground, into the concrete. Moisture from within the concrete may dissipate upwardly through the concrete and come into contact with the floor.

Hardwood flooring and wood in general are hygroscopic materials. Liquid water and water vapor can enter wood which may cause it to swell and change its shape and size, potentially causing bubbling. If and when the water leaves the wood, the wood can shrink which may result in warp, the development of small cracks in the surface of the wood, twists, bows, or even develop cups or dips within each piece of wood flooring. In some cases, cracks in between pieces of wood may open up as the wood dries.

To help prevent moisture from contacting the finished flooring, it may be desirable to place a moisture barrier between the flooring and the subfloor. The moisture barrier may comprise a thin layer of film adhered to the surface of the concrete. In some applications an underlayment layer comprising a layer of polymeric film and a layer of polymeric foam, or a polyethylene film/foam laminate, is provided as an underlayment between the concrete subfloor and finish flooring formed of wood. The underlayment levels small irregularities in the top surface of the concrete, provides a small degree of resiliency to the floor system, and provides a vapor barrier to prevent moisture emanating from the concrete subfloor from attacking and deteriorating the finish flooring.

In addition to potential damage to wood in the flooring, water can also react with excess calcium chloride in the concrete. The reaction of water and calcium chloride is an exothermic reaction that generates heat that can dissipate into the underlayment material. The addition of heat in the polymeric material of either the film or foam layer can result in the cleavage of carbon-hydrogen bonds along the polymer chains and the generation of free radicals in the polymer. The thus generated free radicals can lead to further breakage of carbon bonds and the generation of additional free radicals. Overtime, these continued reactions can lead to degradation and failure of the underlayment material. For example, one or more portions of the underlayment material may prematurely fail, such as the formations of cracks and/or deterioration or delamination of the foam and film layers. Such degradation is particularly troublesome in flooring applications where the failure may not be easily discernable or easily remedied.

Thus, there exists a need for an improved floor underlayment which provides the cushioning, and floor leveling functions of the prior floor underlayments, but which also is resistant to degradation caused by excess heat so to avoid the disadvantages associated therewith.

BRIEF SUMMARY OF THE INVENTION

Embodiments of the present invention are directed to a composite foam material that is alkaline and heat resistance. The composite foam material comprises a foam layer that having a film layer attached thereto and in which at least one of the film or foam layers includes a carbon free radical scavenger agent that is dispersed therein. The carbon free radical scavengers neutralize free radicals that are generated in the polymeric material (e.g., film or foam layer) and help prevent the degradation of the foam composite material. In particular, foam composite materials in accordance with the present invention can be used in underlayment applications in which exposure to heat can degrade the underlayment. As a result, the durability and useful life of the composite foam material can be extended. In some embodiments of the present invention provides a floor underlayment material that overcomes many of the problems discussed above.

In one particular, composite foam materials in accordance with certain embodiments of the present invention are able to meet the requirements of SP Technical Research Institute of Sweden test method SP-Method 1116 (e.g., a maximum of 50% reduction of elongation at break following aging under alkaline conditions).

Suitable carbon free radical scavengers for use in the present invention exhibit a carbon scavenging activity over a temperature range between about 0° to 70° C., and in particular, over a temperature range that is from about 2 to 20° C., and more particularly from about 4° to 16° C. Examples of carbon free radical scavengers that can be used include hindered amines, quinones, benzofuranones (lactones), hydroxylamines, and phenols, and combinations thereof. One particularly, useful hindered amine that can be used in the practice of the invention is poly[(6-[1,1,3,3-tetramethylbutyl) amino]-1,3,5-triazine-2,4-diyl][(2,2,6,6-tetramethyl-4-piperidinyl)imino-1,6-hexanediyl[(2,2,6,6-tetramethyl-4-piperidinyl)imino]]).

In one embodiment, the present invention provides an underlayment material that may be used in a flooring system to help prevent or limit degradation due to the exposure of heat or alkaline materials. In one alternative embodiment, the underlayment material may be disposed between a subfloor and floor. The presence of the carbon radical scavenger in at least one of the foam or film layers helps to prevent the propagation and further creation of carbon radicals that result from the cleavage of hydrogen-carbon bonds along the polymeric chains comprising the foam and/or film layer, and therefore helps to improve the durability of the underlayment material.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
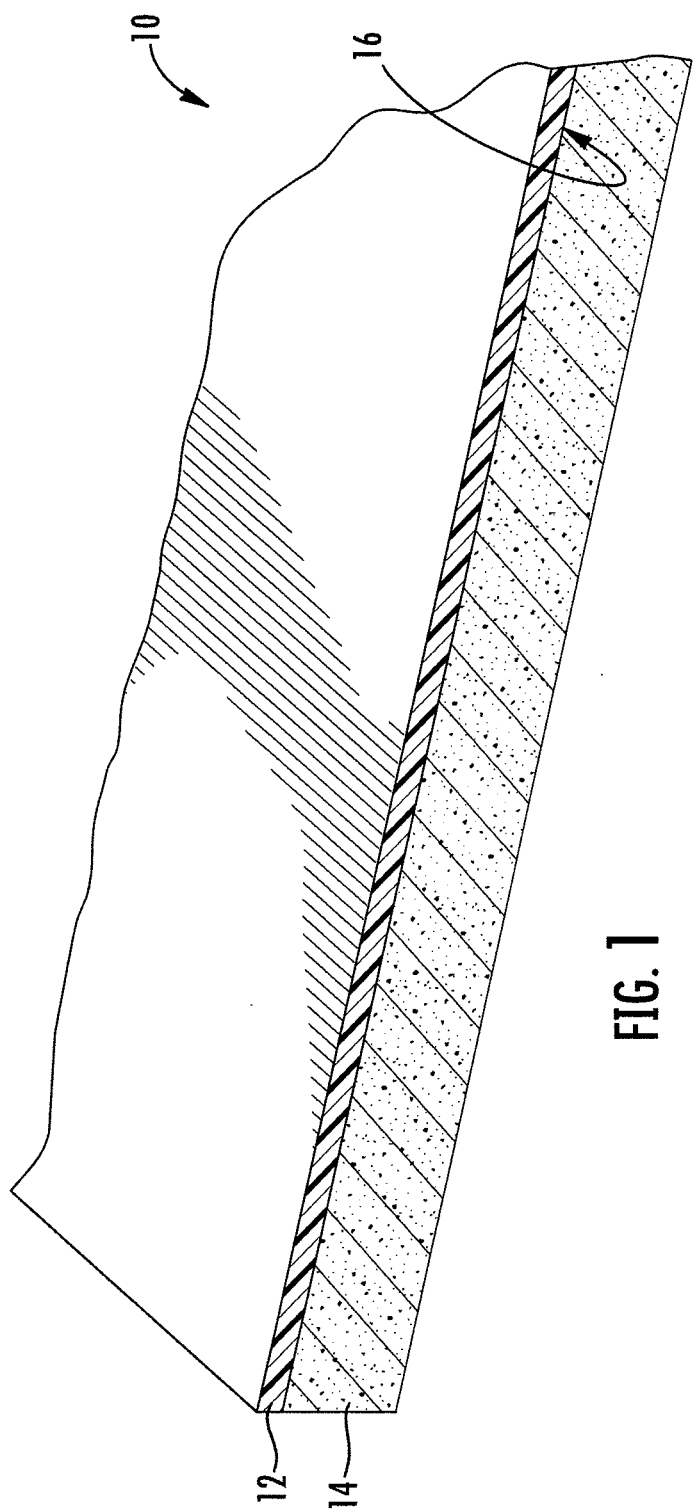
FIG. 1 is a cross-sectional side view of foam composite material in accordance with one embodiment of the invention.

With reference to FIG. 1 a composite foam material is illustrated and broadly designated by reference number 10. In one embodiment, the composite foam material 10 comprises a film layer 12 having an inner surface 16 that is attached to a foam layer 14. At least one of the film or foam layers includes a carbon free radical scavenger agent dispersed therein. The carbon free radical scavengers help to neutralize free radicals that are generated in the polymeric material comprising the foam and film layers. For instance, the exposure to sufficient heat can result in the generation of free radicals along the polymer chains of the polymeric material comprising the foam and film layers. If left unchecked, these thus generated free radicals can react with other carbon sites on or near adjacent polymer chains, resulting in breaking of bonds within the polymer, which in turn, can lead to a degradation of the foam or film layer. The carbon free radical scavengers in the foam or film layers reacts with and neutralizes these generated free radicals so the propagation can be reduced or prevented. As a result, the durability and useful life of the composite sheet material can be extended.

As discussed in greater detail below, composite sheet materials in accordance with the present invention are particularly useful in floor underlayment applications where the underlayment material is likely to be exposed to heat liberated from the reaction of water with calcium chloride. In particular, composite foam materials in accordance with certain the present invention are able to meet the requirements of SP Technical Research Institute of Sweden test methods SP-Method 1116 *Floor underlay of polyethylene cellular plastic* and SP-Method 0414 *Plastics-Accelerated ageing in alkaline environment*, Method C, the contents of which are both hereby incorporated by reference. For example, composite foam materials in accordance with the present invention were first aged in accordance with SP-Method 0414 and then the tensile strength and elongation at break were evaluated in accordance with SP-1116. Foam composite materials in accordance with embodiments of the present invention met the requirements of SP-116 (e.g., a maximum of 50% reduction of elongation at break following aging under alkaline conditions).

Suitable carbon free radical scavengers for use in the present invention exhibit a carbon scavenging activity over a temperature range between about 0° to 70° C., and in particular, over a temperature range that is from about 2 to 20° C., and more particularly from about 4° to 16° C. Examples of carbon free radical scavengers that can be used include hindered amines, quinones, benzofuranones (lactones), hydroxylamines, and phenols, and combinations thereof. One particularly, useful hindered amine that can be used in the practice of the invention is poly[(6-[1,1,3,3-tetramethylbutyl)amino]-1,3,5-triazine-2,4-diyl][(2,2,6,6-tetramethyl-4-piperidinyl)imino-1,6-hexanediyl[(2,2,6,6-tetramethyl-4-piperidinyl)imino]]).

The amount of the carbon free radical scavenger in any one of the film or foams layers is generally from about 0.01 to 2 weight percent, based on the total weight of the layer, and in particular, from about 0.1 to 0.5 weight percent, based on the total weight of the layer. The carbon radical scavenger can be added during extrusion as a melt additive, as is known in the art.

Figure 2:
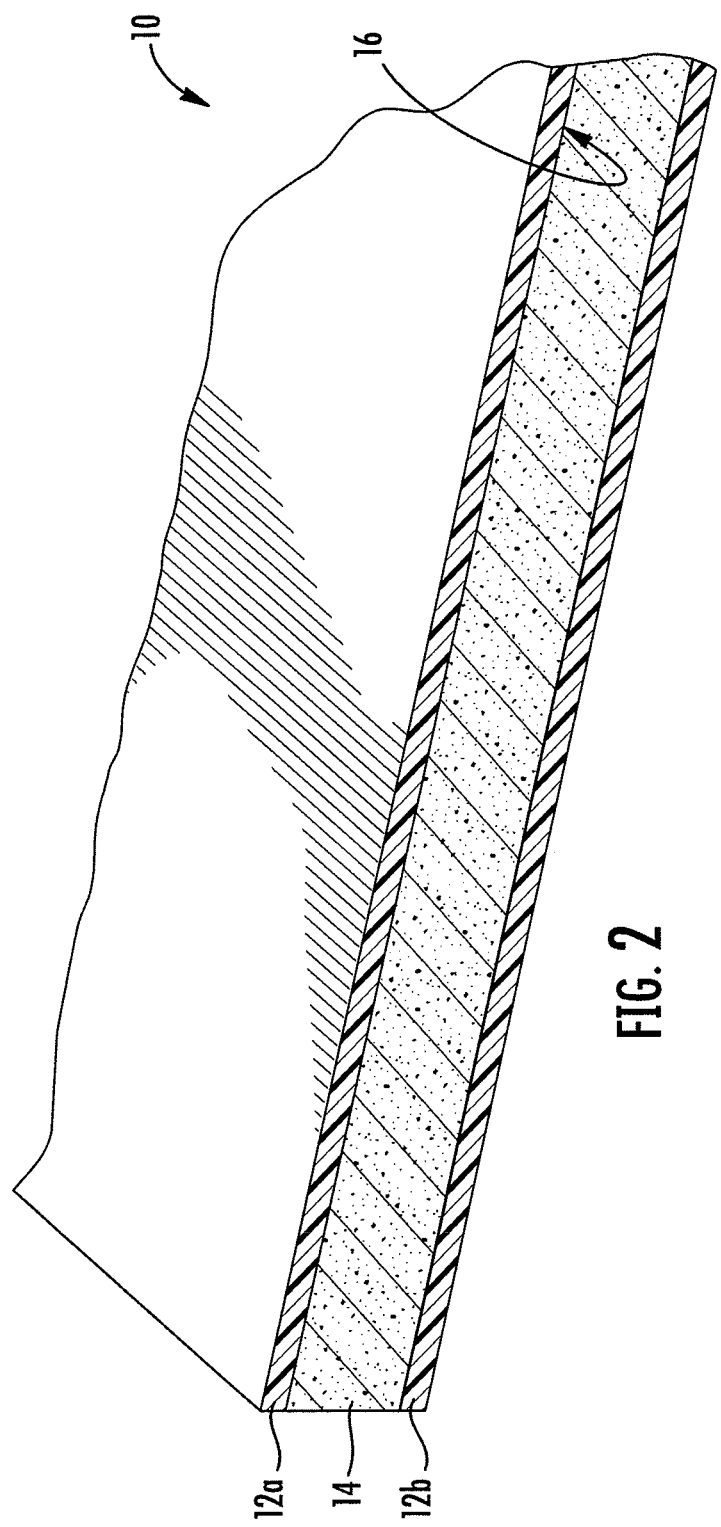
FIG. 2 is a cross-sectional side view of a foam composite material having a foam layer sandwiched between two film layers that is in accordance with one embodiment of the invention.

In some embodiments, the composite sheet material may comprise a second film layer attached to an outer surface of the foam layer to produce a laminate wherein the foam layer is disposed between two film layers. In this regard, FIG. 2 illustrates an embodiment of the invention in which the foam layer 14 is sandwiched between two film layers 12a, 12b. The second film layer may have moisture vapor barrier properties.

Figure 3:
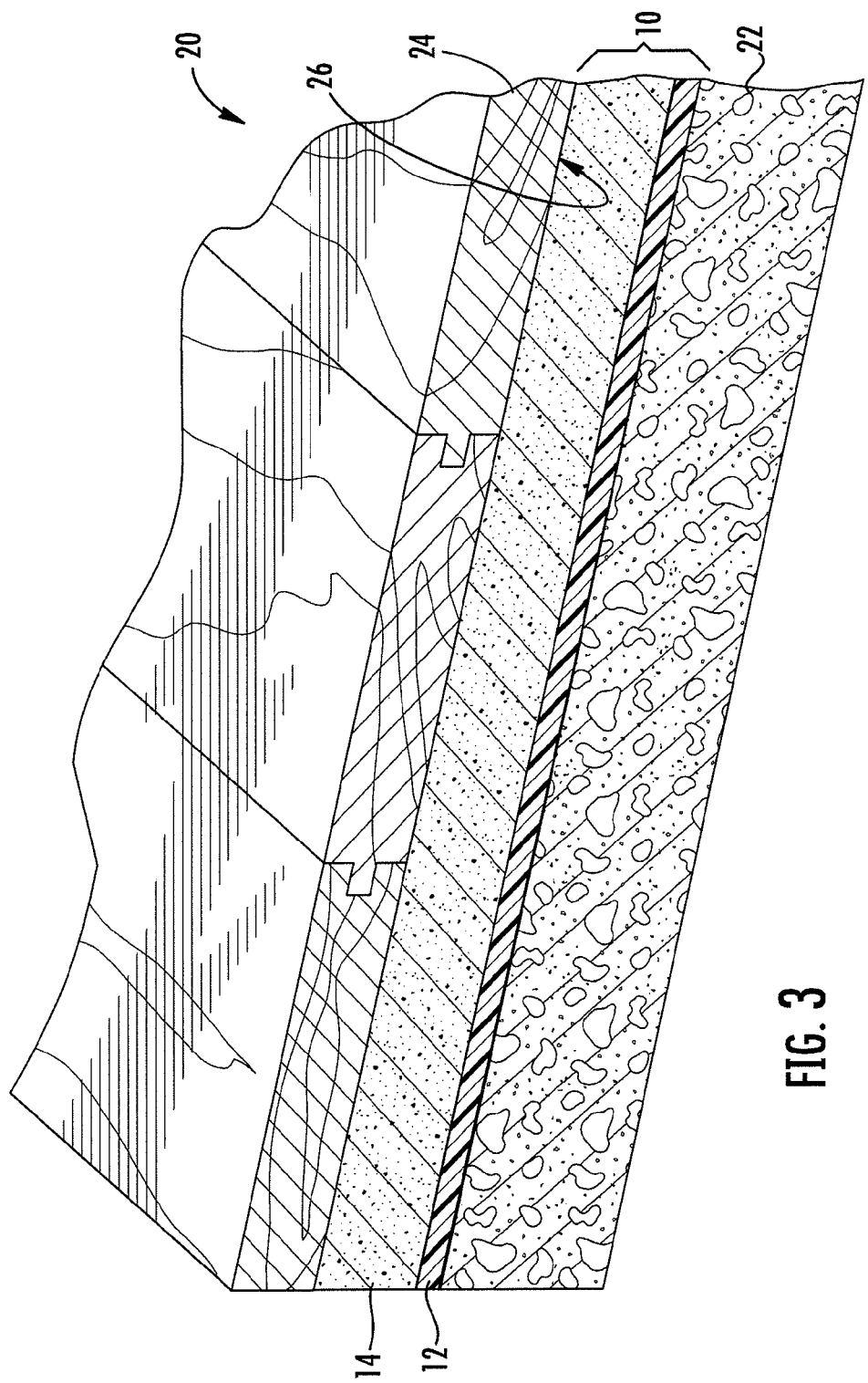
FIG. 3 is a cross-sectional side view of a flooring system including the foam composite material of FIG. 1.

As noted above, the composite foam material is particularly useful as an underlayment material for use in flooring applications. In this regard, FIG. 3 illustrates a cross-sectional side view of an exemplary flooring system 20 in which the underlayment material 10 is disposed between a subfloor 22 and a finished floor 24. The finished floor 24 comprises a series of wood or wood laminate planks fitted together at their edges. In the illustrated embodiment, the film layer 12 is disposed adjacent to the subfloor 22 and the foam layer 14 is disposed adjacent to the finished floor 24. In some embodiments, the foam layer 14 may be disposed adjacent to the subfloor 22.

In one embodiment, the composite sheet material comprises a laminate in which the foam layer and the film layer are attached to one another. The film and foam layers may be attached together in a variety of known ways. Suitable methods of attaching the film and foam layers together include, but are not limited to, the application of an adhesive including a molten polymer, ultrasonic bonding, heat bonding, and the like. In one alternative embodiment, the composite sheet material may be produced by extruding a layer of polymeric resin directly onto the foam layer to thereby form a film layer that is thermally adhered to the foam layer. In other embodiments, the composite sheet material may be produced via heat lamination by feeding a sheet of foam and a sheet of film through a pair of heated rolls that softens and fuses the film layer to a surface of the foam layer.

In some embodiments, the film layer comprises a polymeric material having high moisture barrier properties, such as a water vapor permeability that is less than about 0.8 grams/day/100 in$^2$ at 100° F., 90% relative humidity as measured according to ASTM F1249-01. In the embodiment illustrated in FIG. 3, it may be desirable for the film layer to comprise a material having high moisture vapor barrier properties so that moisture vapor may be substantially prevented from migrating through the film layer and into the foam layer. In some embodiments, the film layer may have a water vapor transmission rate that is less than about 0.25 grams/day/100 in$^2$ at 100° F., 90% relative humidity as measured according to ASTM F1249-01. In other embodiments, the film layer may comprise a polymeric material having low barrier properties, such as a water vapor permeability that is greater than about 0.3 grams/day/100 in$^2$ at 100° F., 90% relative humidity as measured according to ASTM F1249-01. For instance, the film layer may have a water vapor transmission rate that is no greater than about 0.25, 0.35, 0.50, or 0.75 grams/day/100 in$^2$ at 100° F., 90% relative humidity. In some embodiments, it may be desirable for the composite sheet material to have a high water vapor permeability.

The film layer may include one or more thermoplastic polymers including polyolefins, polystyrenes, polyurethanes, polyvinyl chlorides, polyesters, and ionomers provided that the desired properties of the film layer may be maintained.

Suitable polyolefins for use as the film layer may include LLDPE, low density polyethylene, high density polyethylene, metallocene catalyzed polyethylene, polypropylene, and oriented polypropylene, ethylene homo- and co-polymers and propylene homo- and co-polymers. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth) acrylic acid. ("Copolymer" as used in this application means a polymer derived from two or more types of monomers, and includes terpolymers, etc.).

EAOs are copolymers of ethylene and one or more alpha-olefins, the copolymer having ethylene as the majority mole-percentage content. In some embodiments, the comonomer includes one or more $C_3$-$C_{20}$ alpha-olefins, more preferably one or more $C_4$-$C_{12}$ alpha-olefins, and most preferably one or more $C_4$-$C_8$ alpha-olefins. Particularly useful alpha-olefins include 1-butene, 1-hexene, 1-octene, and mixtures thereof.

EAOs include one or more of the following: 1) medium density polyethylene ("MDPE"), for example having a density of from 0.93 to 0.94 g/cm$^3$; 2) linear medium density polyethylene ("LMDPE"), for example having a density of from 0.926 to 0.94 g/cm$^3$; 3) linear low density polyethylene ("LLDPE"), for example having a density of from 0.915 to 0.930 g/cm$^3$; 4) very-low or ultra-low density polyethylene ("VLDPE" and "ULDPE"), for example having density below 0.915 g/cm$^3$; and 5) homogeneous EAOs. Useful EAOs include those having a density of less than about any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler Natta catalysts.

On the other hand, homogeneous polymers are typically prepared using metallocene or other single site-type catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl(meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl(meth)acrylate) comonomer content of the ethylene/unsaturated ester copolymer may range from about 3 to about 18 weight %, and from about 8 to about 12 weight %, based on the weight of the copolymer. Useful ethylene contents of the ethylene/unsaturated ester copolymer may include the following amounts: at least about 82 weight %, at least about 85 weight %, at least about 88 weight %, no greater than about 97 weight %, no greater than about 93 weight %, and no greater than about 92 weight %, based on the weight of the copolymer.

Representative examples of ethylene/unsaturated ester copolymers may include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful propylene copolymer includes propylene/ethylene copolymers ("EPC"), which are copolymers of propylene and ethylene having a majority weight % content of propylene, such as those having an ethylene comonomer content of less than 10%, preferably less than 6%, and more preferably from about 2% to 6% by weight.

Ionomer is a copolymer of ethylene and an ethylenically unsaturated monocarboxylic acid having the carboxylic acid groups partially neutralized by a metal ion, such as sodium or zinc, preferably zinc. Useful ionomers may include those in which sufficient metal ion is present to neutralize from about 15% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

The film layer may have a composition such that any one of the above described polymers comprises at least about any of the following weight percent values: 30, 40, 45, 50, 55, 60, 65, 70, 75, 80, 85, 90, 95, and 100% by weight of the layer. Film layer may have a single layer construction, or may be formed from multiple layers for improved moisture barrier properties. In one embodiment the film layer may be formed from substantially the same polymer, such as low density polyethylene, as is used to form foam layer, or from a different polymer which is adhered to the foam layer. In other embodiments, the foam layer may be formed from a low density form of a polymer, while film layer may be formed from a high density form of the same polymer.

The thickness of the film layer is selected to provide sufficient material to permit the formation of the plurality of recesses in the outer surface. The film layer may have a thickness of at least about any of the following values: 0.2 mils, 0.5 mils, 1 mils, 1.25 mils, 1.5 mils, 2 mils, 2.5 mils, 3 mils, 5 mils, 10 mils, and 20 mils. The film layer may have a thickness ranging from about 0.2 to about 20 mils, more preferably from about 5 to about 15 mils, and still more preferably about 10 mils. Further, the thickness of the film layer as a percentage of the total thickness of the underlayment material may range (in ascending order of preference) from about 1 to about 50 percent, from about 5 to about 45 percent, from about 10 to about 45 percent, from about 15 to about 40 percent, from about 15 to about 35 percent, and from about 15 to about 30 percent. The film layer may have a thickness relative to the thickness of the underlayment material of at least about any of the following values: 1%, 5%, 10%, 20%, and 30%.

The foam layer may comprise a variety of different foamed polymeric materials including polyolefins. The foam layer may be crosslinked or non-crosslinked. In embodiments, in which the foam is crosslinked, it is generally desirable for the carbon radical scavenger to be present only in the film layer. On the other hand, if the foam is non-crosslinked the radical scavenger can be present in the foam layer only or may be present in both the foam and film layers.

Suitable polyolefins may include polyethylene resins, including polyethylene homopolymers and copolymers. Useful polyethylene homopolymers include low-density polyethylene (LDPE), linear low-density polyethylene (LLDPE), and high-density polyethylene (HDPE). Polyethylene copolymers may include homogeneous ethylene/alpha-olefin copolymers, such as metallocene/single-site catalyzed copolymers of ethylene and one or more $C_3$ to $C_{10}$ alpha-olefin comonomers, or heterogeneous Ziegler-Natta catalyzed ethylene/alpha-olefin copolymers. Other ethylene copolymers include propylene, higher olefins and carboxylic acids and esters. Various ethylene copolymers are used in which the second comonomer is a carboxylic acid or ester such as vinyl acetate, acrylic acid, methacrylic acid, methacrylate and ethyl acrylate. Ethylene vinyl acetate (EVA) copolymers with vinyl acetate content ranging up to 30% weight could be used copolymers, such as homogeneous ethylene/alpha-olefin copolymers, heterogeneous Ziegler-Natta catalyzed ethylene/alpha-olefin copolymers, and ethylene vinyl acetate (EVA) copolymers. Suitable polyolefin resins may also include polypropylene homopolymers and copolymers.

The foam layer provides many of the cushioning characteristics of the underlayment material. The thickness and density of the foam layer may be selected so that the underlayment material has the desired cushioning properties. In one embodiment the foam layer has a density from about 0.5 to 15 pcf, and in particular, from about 1 to 10 pcf. In other embodiments, the foam layer has a density that is from about 1.5 to 3.0 pcf, 1.7 to 2.5 pcf, and from 1.9 to 2.2 pcf. The thickness of the foam layer may range from about 0.01 to 3 inches, 0.1 to 2.0 inches, and from 0.75 to 1.5 inches. In one embodiment, the foam layer has a density from about 1.0 to 2.2 pcf and a thickness between about 0.1 to 1.5 inches, and in particular, from about 0.1 to 1 inch.

In some embodiments, the foam layer may include a plurality of spaced apart ribs that extend at least partially along the length of the foam layer. The ribs may provide channels through which a fluid may migrate to the edges of the flooring system. Floor underlayment materials having a plurality of ribs are discussed in greater detail in commonly assigned U.S. patent application Ser. Nos. 10/716,922 and 10/758,402, the contents of which are hereby incorporated by reference.

In some embodiments, the film layer may also include one or more additives, such as antioxidants, anti-corrosion agents, UV stabilizers, fire retardants, fire resistants, anti-bacterial agents, anti-microbial agents, anti-fungal agents, anti-static agents, biostabilizers and/or other functional additives depending on the commercial application of the laminate.

In a preferred embodiment, the foam layer comprises a crosslinked polyolefin, such as a crosslinked polyethylene or crosslinked polypropylene, and the film layer comprises a polyolefin in which the carbon radical scavenger is dispersed.

The underlayment material may be used in a wide variety of applications including flooring applications. As discussed above, the underlayment material may be used in finished flooring applications where it may be desirable to prevent water from accumulating between the floor and the subfloor. Finished floors may include one or more of wood planks, parquet flooring, wood laminate flooring, wood-block flooring, and plastic flooring, such as vinyl flooring and linoleum flooring. In one alternative embodiment the floor may comprise a laminate wood floor including wood laminates which are commercially available. In other embodiments, the underlayment material may be used in conjunction with other types of flooring systems including linoleum and tile floors.

In one embodiment, the floor may comprise wood or laminate planks that are positioned side-by-side on the underlayment material. In one alternative embodiment, the planks may fit together by means of tongue-in-groove arrangement. In some embodiments, the floor may be a so-called "floating floor."

The subfloor may include precast or preformed concrete, poured concrete, or reinforced concrete. In one embodiment, the flooring system comprises a wood subfloor in combination with an underlayment material having low barrier properties. In such an embodiment, a low barrier underlayment material may help permit the escape of fluid from within the flooring system and thereby prevent the accumulation of moisture between the wood subfloor and the underlayment material.

The flooring system may be assembled in any known manner. In one embodiment, the underlayment material is positioned on a concrete subfloor in a free-lying manner. The floor may be in the form of strips of wood or laminate planks. In some embodiments, the underlayment material may not be adhered to the concrete subfloor. In one alternative embodiment, the bottom of the foam layer contacts the top surface of concrete subfloor and the outer surface of the film layer may be at least partially in contact with the underside of the floor. Planks of laminate wood flooring may be positioned on the underlayment material in a free-lying manner. Planks may fit together by means of tongue-in-groove arrangement and in some embodiments may be glued together. The outer surface of the film layer contacts the bottom surface of laminate wood flooring.

In some applications it may also be desirable to adhesively laminate the underlayment material to one or more of the subfloor or the flooring system.

In some embodiments, the underlayment material may only include a foam layer and the presence of a film layer may be optional. For example, in one embodiment the underlayment material may comprise a foam layer comprising a polyolefin cellular material in which the carbon radical scavenger has dispersed, and in which a film layer is not attached to the foam layer.

The following examples are provided for the purpose of illustration only and should not be construed as limiting the invention in any way.

EXAMPLES

In the following example, the alkaline and heat resistance of composite foam materials were investigated by SP Technical Research Institute of Sweden using SP standards SP-Method 116 and SP-Method 0414. Table 1 describes summarizes the four samples that were investigated.

TABLE 1

| Sample No. | Foam layer Composition | Density (lbs./ft$^3$)/ Thickness (in.) | Film layer 1 Composition | Film layer 2 Composition | Carbon scavenger (wt. %) |
|---|---|---|---|---|---|
| Sample 1 | Polyethylene (non-crosslinked) | 2.0 lbs. ft$^3$/0.125 in. | — | — | — |
| Sample 2 | Polyethylene (non-crosslinked) | 2.0 lbs. ft$^3$/0.125 in. | — | — | 0.1 |
| Sample 3 | Polyethylene (non-crosslinked) | 2.0 lbs. ft$^3$/0.125 in. | polyethylene | polyethylene | 0.1/layer |
| Sample 4 | Polypropylene (crosslinked) | 3.0 lbs. ft$^3$/0.085 in. | — | — | — |

Sample 1 comprised a non-crosslinked low density polyethylene foam. No carbon radical scavenger was added to Sample 1.

Sample 2 comprised a non-crosslinked low density polyethylene foam. The foam layer included 0.1 wt. % of poly[(6-[1,1,3,3-tetramethylbutyl)amino]-1,3,5-triazine-2,4-diyl][(2,2,6,6-tetramethyl-4-piperidinyl)imino-1,6-hexanediyl[(2,2,6,6-tetramethyl-4-piperidinyl)imino]]) as a carbon radical scavenger, available from Ciba under the tradename CHEMISORB® 944. The carbon radical scavenger was added as a melt additive during extrusion.

Sample 3 comprised a sandwich construction in which a low density polyethylene foam was sandwiched between a 1 mil thick polyethylene film layer and a 4 mil thick polyethylene film layer. The 1 mil film layer was laminated via in-line lamination using hot drawn and pressure. The 4 mil film layer was extrusion coated onto the foam layer. Each film layer and the foam layer included 0.1 wt. % of poly[(6-[1,1,3,3-tetramethylbutyl)amino]-1,3,5-triazine-2,4-diyl][(2,2,6,6-tetramethyl-4-piperidinyl)imino-1,6-hexanediyl[(2,2,6,6-tetramethyl-4-piperidinyl)imino]]) as a carbon radical scavenger.

Sample 4 comprised crosslinked polypropylene foam. No carbon radical scavenger was added to Sample 4.

Test specimens of Samples 1-4 were prepared in accordance with ISO 1798 *Flexible cellular polymeric materials*. The samples were then exposed in alkaline environment for 24 weeks at +90° C. in accordance with SP-Method 0414.

After exposure, the elongation at break for 5 unexposed and exposed samples for each of Samples 1-4. The mean values are provided in Table 2 below.

TABLE 2

Elongation at Break for Samples 1-4

| Sample No. | Elongation at break before aging (%)* | Elongation at break after aging (%) |
|---|---|---|
| Sample 1 | 77 (9) | <2** |
| Sample 2 | 59 (9) | 51 (4) |
| Sample 3 | 85 (5) | 65 (10) |
| Sample 4 | 173 (29) | 90 (11) |

*standard deviation in brackets
**The <2 value is based on the average 4 of the 5 samples tested. The 5$^{th}$ sample had an elongation of 29% and was considered an outlier.

From the Table 2 above, it can be seen that Samples 2-3 which include the carbon radical scavenger fulfill the requirements of SP-Method 1116 and had less than a 50% reduction in the elongation at break following aging. Sample 1, which did not include the scavenger showed significant reductions in the elongation at break after aging and did meet the requirements. Sample 4, which is a crosslinked foam that did not include the scavenger, also showed significant reductions in elongation at break following aging.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A foam composite comprising a foam layer and a barrier film layer having a surface attached to said foam layer, wherein at least one of the foam and film layers includes a carbon free radical scavenger agent dispersed therein, the carbon free radical scavenger exhibiting a scavenging activity over a temperature range between about 0° to 70° C.; and wherein, the carbon free radical scavenger is present in an amount ranging from about 0.01 to 2 weight percent, based on the total weight of the layer in which the carbon free radical scavenger is dispersed.

2. The foam composite of claim 1, wherein the carbon free radical scavenger is selected from the group consisting of hindered amines, quinones, benzofuranones (lactones), hydroxylamines, and phenols, and combinations thereof.

3. The foam composite of claim 1, wherein the carbon free radical scavenger is present in an amount ranging from about 0.05 to 0.5 weight percent, based on the total weight of the layer in which the carbon free radical scavenger is dispersed.

4. The foam composite of claim 1, wherein the foam layer and the film layer each comprise a polyolefin.

5. The foam composite of claim 1, wherein the foam is crosslinked and the carbon free radical scavenger is dispersed only in the film layer.

6. The foam composite of claim 1, wherein the foam is non-crosslinked and the free radical scavenger is dispersed in the film layer and the foam layer.

7. The foam composite of claim 6, wherein the foam layer does not include a carbon radical scavenger and wherein the foam is a crosslinked polyolefin and the film layer comprises polyethylene having a moisture vapor transmission rate of about 0.8 grams/day/100 in$^2$ at 100° F., 90% relative humidity as per ASTM F1249-01.

8. The foam composite of claim 7, wherein the free radical scavenger is a hindered amine.

9. The foam composite of claim 7, wherein the free radical scavenger is poly[(6-[1,1,3,3-tetramethylbutyl)amino]-1,3,5-triazine-2,4-diyl][(2,2,6,6-tetramethyl-4-piperidinyl)imino-1,6-hexanediyl[(2,2,6,6-tetramethyl-4-piperidinyl)imino]]).

10. The foam composite of claim 1, wherein the film layer comprises a thermoplastic material having a moisture vapor transmission rate no greater than about 0.8 grams/day/100 in$^2$ at 100° F., 90% relative humidity as per ASTM F1249-01.

11. The foam composite of claim 1, wherein the thickness of the film layer is between 0.2 and 20 mils.

12. The foam composite of claim 1, wherein the foam layer comprises low density polyethylene foam having a density from about 1.0 to 3 pcf and a thickness of about 0.1 to 1.5 inches.

13. The foam composite of claim 1, wherein the foam layer and the film layer each comprises a material that is substantially the same polymer.

14. A floor underlayment material configured to reduce or prevent degradation of the underlayment material due to heat liberated by reaction of water and calcium chloride:
a foam layer comprising a crosslinked low density polyethylene and having a density that is from about 1.0 to 10 pcf and a thickness of about 0.1 to 1 inches; and
a film layer comprising a polyolefin attached to the foam layer, the film layer including a carbon free radical scavenger dispersed therein, the carbon free radical scavenger exhibiting a scavenging activity over a temperature range between about 0° to 70° C. such that free radicals generated in the polyolefin are neutralized by the carbon free radical scavenger; and wherein,
the carbon free radical scavenger is present in an amount ranging from about 0.01 to 2 weight percent, based on the total weight of the layer in which the carbon free radical scavenger is dispersed.

15. The floor underlayment material according to claim 14, wherein the foam layer is thermally bonded to the film layer.

16. The floor underlayment material of claim 14, wherein the carbon free radical scavenger is selected from the group consisting of hindered amines, quinones, benzofuranones (lactones), hydroxylamines, and phenols, and combinations thereof.

17. The floor underlayment material of claim 14, wherein the carbon free radical scavenger is present in an amount ranging from about 0.05 to 0.5 weight percent, based on the total weight of the film layer.

18. The floor underlayment material of claim 14, wherein the free radical scavenger is a hindered amine.

19. The floor underlayment material of claim 18, wherein the free radical scavenger is poly[(6-[1,1,3,3-tetramethylbutyl)amino]-1,3,5-triazine-2,4-diyl][(2,2,6,6-tetramethyl-4-piperidinyl)imino-1,6-hexanediyl[(2,2,6,6-tetramethyl-4-piperidinyl)imino]]).

20. The floor underlayment material of claim 18, wherein the underlayment material meets the requirements of SP Method 1116.

21. A flooring system comprising:
a subfloor;
a floor; and
a floor underlayment material between the subfloor and the floor, the underlayment material comprising a foam layer and a film layer, wherein at least one of the foam and film layers includes a carbon free radical scavenger agent dispersed therein, the carbon free radical scavenger exhibiting a scavenging activity over a temperature range between about 0° to 70° C.; and wherein,
the carbon free radical scavenger is present in an amount ranging from about 0.01 to 2 weight percent, based on the total weight of the layer in which the carbon free radical scavenger is dispersed.

22. The flooring system of claim 21, wherein the carbon free radical scavenger is selected from the group consisting of hindered amines, quinones, benzofuranones (lactones), hydroxylamines, and phenols, and combinations thereof.

23. The foam composite of claim 21, wherein the carbon free radical scavenger is present in an amount ranging from about 0.05 to 0.5 weight percent, based on the total weight of the layer in which the carbon free radical scavenger is dispersed.

24. The flooring system of claim 21, wherein the foam layer and the film layer each comprise a polyolefin.

25. The flooring system of claim 21, wherein the foam is crosslinked and the carbon free radical scavenger is dispersed only in the film layer.

26. The flooring system of claim 21, wherein the foam is non-crosslinked and the free radical scavenger is dispersed in the film layer and the foam layer.

27. The flooring system of claim 21, wherein the foam is a crosslinked polyolefin and the film layer comprises low density polyethylene having a moisture vapor transmission rate of about 0.2 grams/day/100 in$^2$ at 100° F., 90% relative humidity as per ASTM F1249-01.

28. The flooring system according to claim 21, wherein the underlayment material includes a second film layer attached to the foam layer and disposed adjacent to the subfloor, the second film layer including a carbon radical scavenger dispersed therein.

29. The flooring system according to claim 21, wherein the floor includes one or more of wood planks, parquet flooring, wood laminate flooring, or wood-block flooring.

30. The flooring system of claim 21, wherein the subfloor comprises concrete.

31. A method of installing a finished floor over a subfloor comprising:
providing an underlayment material comprising
a foam layer comprising a crosslinked low density polyethylene and having a density that is from about 1.0 to 10 pcf and a thickness of about 0.1 to 1 inches; and a film layer comprising a polyolefin attached to the foam layer, the film layer including a carbon free radical scavenger dispersed therein, the carbon free radical scavenger is present in an amount ranging from about 0.01 to 2 weight percent, based on the total weight of the layer in which the carbon free radical scavenger is dispersed, wherein the carbon free radical scavenger exhibiting a scavenging activity over a temperature range between about 0° to 70° C. such that free radicals generated in the polyolefin are neutralized by the carbon free radical scavenger;

laying down the underlayment material onto a surface of the subfloor; and installing a finished floor over the underlayment material, such that the fluid pathways extend adjacent to at least one of the subfloor and the underside of the finished floor.

32. The method of installing a finished floor according to claim 31, wherein the step of laying down the underlayment material includes placing the underlayment onto the subfloor so that the film layer is facing the finished floor.

* * * * *